Dec. 20, 1938.　　　　R. SUMNER　　　　2,140,862
PLANT POT HOLDER
Filed Jan. 24, 1938

Robert Sumner,
INVENTOR

BY Victor J. Evans & Co.
ATTORNEYS

WITNESS

Patented Dec. 20, 1938

2,140,862

UNITED STATES PATENT OFFICE 2,140,862

PLANT POT HOLDER

Robert Sumner, Washington, R. I.

Application January 24, 1938, Serial No. 186,683

4 Claims. (Cl. 47—34)

This invention relates to plant pot holders and its general object is to provide a device of that character that is designed for holding and supporting a potted plant with respect to the ground and particularly from being blown over by the wind, with the result it will be obvious that my holder is extremely desirable for use in cemeteries for holding potted plants on and with respect to graves.

A further object is to provide a plant pot holder that can be stamped, cut or otherwise formed into a single piece from a sheet of resilient material, such as metal or the like, to provide ground penetrating means and pot receiving and clamping means that cooperate with each other to hold and support a potted plant against casual removal or displacement.

Another object is to provide a plant pot holder that can be easily and expeditiously applied and removed with respect to the pot, and is substantially hidden from view when in use, especially if used on grassy plots.

A still further object is to provide a plant pot holder that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
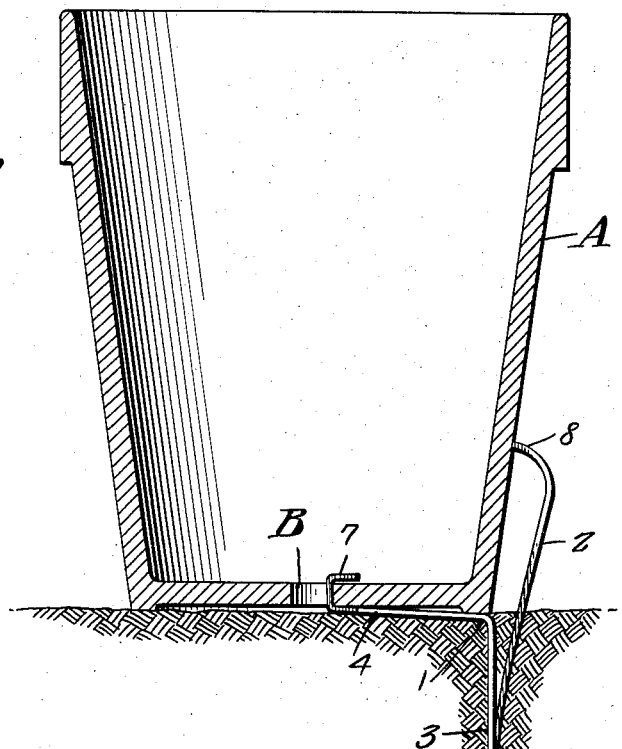
Figure 1 is an enlarged view illustrating my holder in use, in that it is applied to the pot and inserted into the ground, and the pot is shown in section and the holder in elevation.
Figure 2:
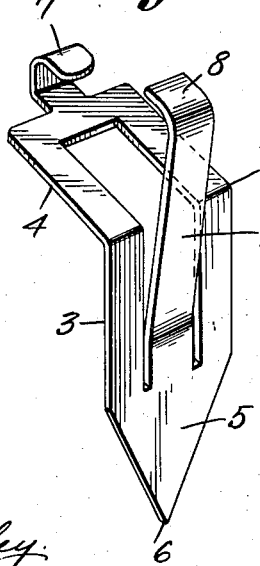
Figure 2 is a perspective view of the holder per se.
Figure 3:
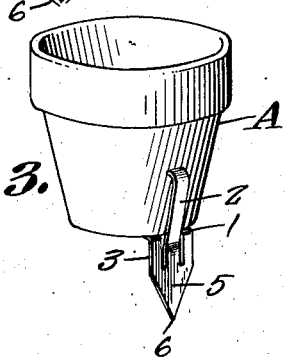
Figure 3 is a perspective view illustrating the holder applied to the pot.

Referring to the drawing in detail, the letter A indicates a plant pot of the usual construction, with the usual drain opening or hole B in the bottom thereof.

My holder is preferably stamped or otherwise formed into a single piece, from a single sheet of resilient material, such as metal, to provide a body 1 in the form of an elongated frame, in that the body has struck longitudinally therefrom an upright spring arm or tongue 2 and the body is bent substantially midway its ends to provide a vertical or depending ground receiving portion 3 and a horizontal pot receiving portion 4 that engages with the under surface of the bottom of the pot as best shown in Figure 1.

The vertical or depending portion 3 is provided with a substantially triangular shaped lower end 5 to provide a penetrating point 6, to facilitate the application of the portion 3 within the ground, as shown in Figure 1, and formed on the outer or free end of the pot receiving portion 4, is a hook 7 to be received in the drain opening or hole B, the hook being substantially square cornered for fitting association with the bottom wall, as indicated in Figure 1.

The upright spring arm 2 is preferably bent outwardly from the body, for disposal at an outward and an upward inclination, and the arm terminates in an inwardly curved upper end 8 directed in a manner whereby the extremity thereof will engage the vertical wall of the pot so that the arm will set up a clamping engagement therewith and for cooperation with the hook 7 for firmly clamping the device to the pot, as will be apparent upon inspection of Figure 1.

From the above description and disclosure of the drawing, it will be obvious that my device can be readily applied to the pot of a potted plant and that the ground penetrating portion 3 is held substantially rigid, so that very little difficulty will be experienced in inserting the same within the ground, and such can be accomplished in many instances, merely by setting the pot upon the ground.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A plant pot holder comprising ground penetrating means, a tongue rising from the penetrating means, hook means cooperating with the tongue to set up a clamping association with the pot, and said tongue and hook means cooperating with the penetrating means to hold and support the pot in an upright position.

2. A plant pot holder comprising a body including a vertical portion and a horizontal portion, penetrating means for the vertical portion, a resilient tongue rising from the penetrating means, hook means on said horizontal portion and cooperating with the tongue to set up a clamping association with the pot and said tongue and hook means cooperating with the penetrating means to hold and support the pot in an upright position.

3. A plant pot holder comprising a body including a vertical portion and a horizontal portion, said vertical portion having a reduced lower end providing a penetrating point, a tongue struck from the body and rising therefrom, hook means formed on the horizontal portion and co-operating with the tongue to set up a clamping association with the pot, and said tongue and hook means cooperating with the vertical portion to hold and support the pot in an upright position.

4. A plant pot holder formed from a single sheet of resilient material and comprising a body bent substantially midway its ends to provide a vertical portion and a horizontal portion, said vertical portion having a triangular shaped lower end terminating in a penetrating point, a tongue struck from the body and rising from the vertical portion at on outward inclination, a curved upper end for the tongue and engageable with the pot, a hook formed on the horizontal portion to be received in the drain opening of the pot for cooperation with the tongue to set up a clamping association with the pot, and said tongue and hook cooperating with the vertical portion to hold and support the pot in an upright position.

ROBERT SUMNER.